United States Patent Office 3,575,920
Patented Apr. 20, 1971

3,575,920
VULCANIZABLE COMPOSITIONS OF AN OLEFIN POLYMER OR COPOLYMER AND VULCANIZED ARTICLES OBTAINED THEREFROM
Giuliano Ballini and Carlo Bujtar, Ferrara, Italy, assignors to Montecatini Edison S.p.A., Milan, Italy
No Drawing. Continuation-in-part of application Ser. No. 492,860, Oct. 4, 1965, which is a continuation-in-part of application Ser. No. 483,843, Aug. 30, 1965. This application Feb. 12, 1968, Ser. No. 705,264
Int. Cl. C07c *43/30;* C08k *1/32*
U.S. Cl. 260—41                                                  11 Claims

ABSTRACT OF THE DISCLOSURE

Vulcanizable composition of elastomeric polymer, reinforcing filler, free-radical acceptor and organic peroxyether free-radical generator wherein carbon atom bound to both ether and peroxy radical is substituted with member selected from alkyl, cycloalkyl and aryl radicals and contains no hydrogen substituent, and vulcanized article obtained therefrom.

CROSS REFERENCES TO RELATED APPLICATIONS

This application is a continuation-in-part of copending application Ser. No. 492,860, filed Oct. 4, 1965, now abandoned which is in turn a continuation-in-part of application Ser. No. 483,843, filed Aug. 30, 1965, now abandoned.

BACKGROUND OF THE INVENTION

(1) Field of the invention

The present invention relates to vulcanizable compositions comprising an elastomeric polymer, a reinforcing filler, a free-radical generator that is an organic peroxide having certain specified characteristics, and a free-radical acceptor. The invention also relates to the vulcanized articles obtained therefrom.

(2) Description of the prior art

The use of organic percompounds together with particular free-radical acceptors as cross-linking agents for olefin polymers and for copolymers of ethylene with higher alphaolefins is known. More particularly, there has previously been described the use of monoperoxides such as dicumylperoxide and tert. butyl cumyl peroxide and of diperoxides such as 2,5 - dimethyl - 2,5 - di(tert.butylperoxy) - hexane, alpha - alpha' - bis(tert.butylperoxy)-diisopropylbenzene, 2,5 - dimethyl - 2,5 - di(tert.butylperoxy)hexyne-3, etc.

These percompounds have relatively low decomposition rates, resulting in vulcanization times considerably higher than those times associated with traditionally known unsaturated elastomers vulcanized with sulfur and accelerators.

It has not been possible to obtain a higher vulcanization rate with elastomers charged with carbon black using these alkyl or arylalkyl peroxides, unless the vulcanization temperature is increased.

Peroxides are also known which have a lower period of semi-decomposition and therefore a higher vulcanization rate than those described above, e.g., certain diaroylperoxides and tert.alkylperesters, such as dibenzoyl peroxide and tert.butyl perbenzoate.

However, these peroxides are somewhat disadvantageous in that they are sensitive to the reinforcing fillers of carbon black. Such fillers significantly reduce or even destroy the vulcanizing activity of such peroxides. Hence these peroxides have only a very limited practical use in the peroxidic vulcanization of natural or synthetic elastomeric materials.

In a preceding patent application, Ser. No. 343,950 filed on Feb. 11, 1964, peroxides of a new type have been described, namely, perketals and peracetals, such peroxides being characterized by a high decomposition rate accompanied by little or no sensitivity to the negative influence of reinforcing fillers particularly fillers of carbon black. These peroxides, however, produce vulcanizates having a lessened resistance to ageing.

An object of the present invention is a vulcanizable composition of a saturated or unsaturated elastomer and containing a reinforcing filler and an organic peroxide, which composition does not suffer from the disadvantages encountered when using prior art peroxidic agents.

SUMMARY OF THE INVENTION

The vulcanizable compositions of the present invention comprise (1) an elastomeric polymer, namely, either a saturated amorphous copolymer of ethylene with a higher alpha-olefin, or a terpolymer of ethylene with an alpha-olefin and a cyclic or acyclic polyene having non-conjugated double bonds, such terpolymer having a low degree of residual unsaturation, (2) a reinforcing filler, (3) a free-radical acceptor, and (4) a free-radical generator, namely, a peroxyether represented by the formula

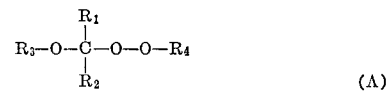

(A)

or by the formula

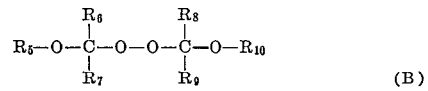

(B)

in which:

R₁ is an unsubstituted alkyl or cycloalkyl radical containing up to 10 carbon atoms or an unsubstituted or alkyl substituted aryl radical containing up to 10 carbon atoms;

R₂ is an unsubstituted alkyl or cycloalkyl radical containing up to 10 carbon atoms or an unsubstituted or alkyl substituted aryl radical containing up to 10 carbon atoms;

and R₁ and R₂, taken together with the central carbon atom, can form a cycloaliphatic ring;

R₃ is an unsubstituted alkyl or an unsubstituted or alkyl substituted cycloalkyl, aryl, or arylalkyl radical containing up to 10 carbon atoms;

R₄ is an unsubstituted alkyl or an unsubstituted or alkyl substituted tertiary arylalkyl radical containing up to 10 carbon atoms;

or one of R₂ and R₄, but not both simultaneously may have the following formula A or B, respectively; either (A) R₂ may have the formula

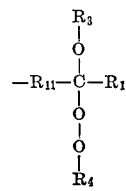

in which:

R₁₁ contains up to 10 carbon atoms and is an unsubstituted or alkyl substituted alkylene, cycloalkylene, alkenylene, alkynylene or arylene radical, and R₁, R₃ and $R_4$ are as defined above, or (B) $R_4$ may have the formula:

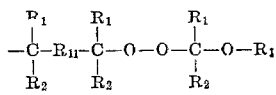

in which:

$R_1$, $R_2$ and $R_{11}$ are as defined above; $R_{12}$ is an unsubstituted alkyl or an unsubstituted or alkyl substituted tertiary arylalkyl radical containing up to 10 carbon atoms;

$R_6$, $R_7$, $R_8$ and $R_9$ are each an unsubstituted alkyl or cycloalkyl radical containing up to 10 carbon atoms, or an unsubstituted or alkyl substituted aryl radical containing up to 10 carbon atoms. $R_5$ and $R_{10}$ are each an unsubstituted alkyl or an unsubstituted or alkyl substituted cycloalkyl, aryl, or arylalkyl radical containing up to 10 carbon atoms; and $R_6$ and $R_7$ and/or $R_8$ and $R_9$ may form a cycloaliphatic ring with the central carbon atom to which they are linked.

The present invention therefore includes new vulcanizable compositions comprising amorphous saturated copolymers of ethylene with an alpha-olefin such as propylene or butene-1, or slightly unsaturated terpolymers of ethylene with an alpha-olefin and a cyclic or acyclic non-conjugtaed diene, along with the aforedescribed peroxyethers, a reinforcing filler, and, if desired, antioxidants, coagents, and other additives conventionally employed in vulcanizable compositions.

A further aspect of the present invention relates to vulcanized articles obtained by heating the foregoing compositions to a temperature greater than the decomposition temperature of the peroxyethers contained therein, the heating being for a time sufficient to effect crosslinking.

DESCRIPTION OF THE PREFERRED EMBODIMENTS

Typical suitable peroxyethers conforming to the general formulae previously set forth include:

2-methoxy-2-tert.butyl-peroxy-propane
2-ethoxy-2-tert.butyl-peroxxy-propane
2-isopropoxy-2-tert.butyl-peroxy-propane
2-isobutoxy-2-tert.butyl-peroxy-propane
2-ethoxy-2-tert.butyl-peroxy-propane
2-methoxy-2-(cumyl-peroxy)propane
2-ethoxy-2-(cumyl-peroxy)propane
α-methoxy-α-tert.butylperoxy-ethylbenzene
α-ethoxy-α-tert.butylperoxy-ethylbenzene
α-isopropoxy-α-tert.butylperoxy-ethylbenzene
α-methoxy-α (cumylperoxy)-ethylbenzene
α-ethoxy-α (cumylperoxy)ethylbenzene
α,α'-dimethoxy-α,α'-di(tert.butylperoxy)-p-diethyl-benzene
α,α'-dimethoxy-α,α'-di(tert.butylperoxyl)-m-diethyl-benzene
α,α'-diethoxy-α,α'-di(tert.butylperoxy)-m-diethyl-benzene
α,α'-diethoxy-α,α'-di(tert.butylperoxy)-p-diethylbenzene
α,α'-diethoxy-α,α'-di(cumylperoxy)-m-diethylbenzene
α,α'-dimethoxy-α,α'-di(cumylperoxy)-p-diethylbenzene
α,α'-dimethoxy-α,α'-di(cumylperoxy)-m-diethylbenzene
α,α'-diethoxy-α,α'-di(cumylperoxy)-p-diethylbenzene
2,2'-dimethoxy-diisopropylperoxide
1,1'-dimethoxy-1,1'-diphenyl-diethylperoxide
2,5-di[di(2,2'-dimethoxy)isopropylperoxy]-2,5-dimethylhexyne-3
2,2'-diethoxy-diisopropylperoxide
α-tert.butylperoxychromane
1,4-endoperoxy-1,4-dimethoxy-cyclohexane
1,4-diisopropylbenzene-α,α'-bis(2-ethoxy-isopropyl-peroxide)
1,3-diisopropylbenzene-α,α'-bis(2-ethoxy-isopropyl-peroxide)
2-tert.butoxy-2-tert.butylperoxy-propane
1-phenyl-1-(α,α'-dimethyl)benzylperoxy-1-tert.butoxy-ethane
1-phenyl-1-tert.butylperoxy-1-tert.butoxy-ethane
di-(2,2'-di-tert.butoxy)isopropylperoxide
1,4-di(α-tert.butoxy-α-tert.butylperoxy-ethyl)benzene The advantage offered by the aforementioned class of peroxyethers in the vulcanization of olefin polymers or copolymers, particularly ethylene-higher alpha-olefin copolymers, is that they permit a rapid vulcanization, not hindered by the presence of carbon black. Additionally, the resistance to ageing of olefin copolymers vulcanized with our peroxyethers is greater than that of the vulcanizates obtained using other types of peroxides in general, including also aryl and aralkyl peroxides.

The above described peroxyethers can be prepared according to a new method described in copending application Ser. No. 505,761, filed Oct. 29, 1965, corresponding to Italian patent application Ser. No. 23,317/64, filed Oct. 30, 1964, now Italian Patent 742,088, issued Jan. 16, 1967, by reacting a hydroperoxide and an alkyl-vinyl- or 1-alkenylalkylether in the presence of solid catalysts in heterogeneous phase, e.g., cation exchange resins, alumina silica gel, or carbon black.

Alternatively, these peroxyethers can be obtained by applying methods known in the art for the preparation of other peroxidic compounds, such as, e.g., (1) addition of organic hydroperoxides or of hydrogen peroxide to alkylvinylethers, e.g., under the conditions described in U.S. Pat. No. 2,776,319 by using the traditional homogeneous acid catalysts;
(2) transperoxidation of an acetal with an organic hydroperoxide according to the general method described by Rieche et al. (Chem. Ber. 94, 2457 (1961));
(3) reaction between an alpha-substituted ether and hydrogen peroxide or an alkylhydroperoxide according to Rieche et al. (Chem. Ber. 90, 1225 (1957));
(4) reaction between a saturated ether and a hydroperoxide, catalyzed by a transition metal salt, described by Kharasch et al. (J. Org. Chem. 24, 72–78 (1959)).

The above described peroxides, present as vulcanizing agents in the compositions of the present invention, produce vulcanizates having a high resistance to ageing and exhibiting elastic characteristics superior to those obtained using other types of peroxides that exert a rapid vulcanizing action.

The mixture containing the peroxyether can be strained, extruded, and calendered at the normal temperatures employed in the rubber industry, thereby obtaining manufactured articles which, in spite of the rapid vulcanization rate, do not reveal blisters or scorching.

The amount of the peroxyether employed in the vulcanizable compositions of this invention should be from about 0.1 to 20 parts by weight, preferably between 1 to 10 parts by weight, per 100 parts of polymer or copolymer. The tolerable amount of carbon black may be virtually any quantity within the limits of the physical compatibility of carbon black with the polymeric material.

For ethylene-alpha-olefin copolymers vulcanized with peroxides, the effectiveness of the vulcanization and the characteristics of the resulting vulcanizates have been found to be improved when there is also added to the mix a substance which acts as free-radical acceptor such as, e.g., sulfur, quinone type compounds, vinyl and divinyl monomers, polymers containing vinyl unsaturations, dimaleimides, furfural, and their derivatives, generally in a concentration range of from about 0.01 to 10 parts by weight, and preferably from about 0.3 to 3 parts by weight, per 100 parts of polymer or copolymer.

In the vulcanization of olefin copolymers with the peroxyethers of the present invention, it has been observed that the addition of a metal oxide, preferably zinc oxide, in addition to the previously specified auxiliary substances, causes a further improvement in the properties of the vulcanizates. The amount of zinc oxide may be from about 0.1 to 20 parts by weight, per 100 parts by weight of polymer or copolymer.

The mixes of polymers or copolymers containing the peroxyethers, possibly reinforcing fillers, auxiliary substances, plasticizers and antioxidants known in the art, are prepared with the equipment conventionally used for mechanical mixing in the rubber industry.

The peroxyethers of the present invention are particularly well suited for the vulcanization of copolymers of ethylene with propylene and/or butene-1, which copolymers have an ethylene content of from about 20 to 80 mole percent and a molecular weight of from about 50,000 to 800,000 corresponding to a Mooney viscosity ML (1+4) at 100° C. of from about 20 to 80. A preferred molecular weight range is from about 80,000 to 500,000.

The peroxyethers are equally well suited for the vulcanization of copolymers having a low degree of residual unsaturation, more particularly, terpolymers of ethylene with a higher alpha-olefin and a third monomer, namely a cyclic or acyclic polyene having non-conjugated double bonds, such as, e.g., terpolymers of ethylene with propylene or butene-1 and cyclooctadiene-1,5; cyclooctadiene-1,4; cyclododecadiene-1,6; cyclododecadiene-1,7; cyclododecatriene-1,5,9; cycloheptadiene-1,4; cyclohexadiene-1,4; norbornadiene; methylnorbornene; 2-methylpentadiene-1,4; hexadiene-1,5; 6-methyl-4,7,8,9-tetrahydroindene; 5,6-dimethyl-4,7,8,9-tetrahydroindene or dicyclopentadiene, characterized by the presence of from about 0.05 to 1 double bond per 100 carbon atoms, by an ethylene content from 20 to 80 mole percent, and by the same molecular weight range as set forth above for saturated olefin copolymers.

The vulcanization may be carried out in a press, in a molten salt bath, in a fluidized solid bed, or in molds in a direct steam autoclave.

Suitable reinforcing fillers are the carbon black fillers of the various types and the mineral fillers.

The temperature at which the vulcanization is carried out is generally from about 110° to 230° C., and preferably is from about 140° to 180° C.

The following examples will further illustrate the invention. All parts are by weight unless otherwise stated.

EXAMPLE 1

2-tert.butylperoxy-2-tert.butoxy-propane was prepared according to the general method described by Kharasch and Fono (J. Org. Chem. 24, 72–78 (1959)) from tert.-butyl-isopropyl ether and tert.butyl-hydroperoxide according to the equation:

tert.BuOCH(CH$_3$)$_2$+2 tert.BuOOH→
   tert.BuOC(CH$_3$)$_2$OOtert.Bu+tert.BuOH+H$_2$O 36 g. of tert.butyl hydroperoxide were added to 116 g. of tert.butyl-isopropylether in the presence of 2.5 g. of anhydrous cobalt acetate as the catalyst.

The reaction was carried out at 40° C. under nitrogen for 2 hours. The mixture was then cooled and filtered. The filtrate was washed first with water and then three times with a 10% NaOH solution (to remove the excess of hydroperoxide). The organic layer was dried on Na$_2$SO$_4$ and the excess tert.butyl isopropylether was distilled off under a low vacuum.

The residue was then rectified in an analytical column under a high vacuum, thus obtaining a fraction boiling at 38–40° C. under 1 mm. Hg and having the following characteristics:

| | Found | Calculated |
|---|---|---|
| Axtive oxygen, percent | 7.8 | 7.85 |
| Carbon, percent | 58.0 | 64.6 |
| Hydrogen, percent | 10.9 | 11.75 |
| Molecular weight (cryoscopic) | 177 | 204 |
| Index of refraction $n_D^{20}$ | 1.4148 | |

The product thus obtained was used for vulcanizing a mix having the following composition:

| | Parts by weight |
|---|---|
| Ethylene-propylene copolymer (55 mole percent of propylene; ML (1+4) at 100° C.=35) | 100 |
| HAF carbon black | 50 |
| Sulfur | 0.32 |
| Zinc oxide | 3 |
| 2-tert.butylperoxy-2-tert.butoxy-propane | 4 |

After vulcanization at 165° C. for 11 minutes in a press, a vulcanizate having the following characteristics was obtained:

| | |
|---|---|
| Tensile strength, kg./cm.$^2$ | 168 |
| Elongation at break, percent | 500 |
| Modulus at 300%, kg./cm.$^2$ | 83 |
| Permanent set, percent | 11.5 |

EXAMPLE 2

According to a technique described in the literature,[1] the vulcanization times of mixes containing the peroxyether prepared and used in Example 1 were determined in a vulcanometer.

The results obtained with some known aryl-alkyl-peroxides and perketals are also reported for comparison.

The base composition was as follows:

| | Parts by weight |
|---|---|
| Ethylene-propylene copolymer (55 mole percent of propylene; ML (1+4) at 100° C.=35) | 100 |
| HAF carbon black | 50 |
| Sulfur | 0.32 |
| Peroxide | See below. |

The following values (minutes) were determined in a vulcanometer at 165° C. and 150° C., respectively:

| | Vulcanization time, minutes | |
|---|---|---|
| Peroxide (type and amount) | at 165° C. | at 150° C. |
| 2-tert.butyl-peroxy-2-tert.butoxy-propane; 4 parts by weight | 11 | 45 |
| Dicumylperoxide; 2.7 parts by weight | 29 | 102 |
| 2,2-di(4-4-(tert.butylperoxy)cyclohexyl)propane; 3 parts by weight | 6 | 15 |
| 2,2,5,5-tetra(tert.butylperoxy)hexane; 2.43 parts by weight | 11 | 38 |

EXAMPLE 3

A mix was prepared of ethylene-propylene copolymer, containing 2-ethoxy-2-tert.butylperoxypropane and having the following composition:

| | Parts by weight |
|---|---|
| Ethylene-propylene copolymer (55 mole percent of ethylene; ML (1+4) at 100° C.=35) | 100 |
| HAF carbon black | 50 |
| Zinc oxide | 3 |
| Sulfur | 0.32 |
| Peroxide (97%) | 5.28 |

The mix was vulcanized at 150° C. for 30 minutes to give a vulcanizate having the following mechanical characteristics:

| | |
|---|---|
| Tensile strength (kg./cm.$^2$) | 169 |
| Elongation at break (percent) | 405 |
| Modulus at 200% (kg./cm.$^2$) | 60 |
| Modulus at 300% (kg./cm.$^2$) | 114 |
| Permanent set (percent) | 8.5 |

EXAMPLE 4

A mix of ethylene-propylene copolymer containing

---

[1] H. D. Stemmer, Kautschuk und Gummi, 14 (5), WT 146 (1961).

alpha - methoxy-alpha-tert.butylperoxy-ethyl-benzene and having the following composition was prepared:

| | Parts by weight |
|---|---|
| Ethylene-propylene copolymer (as in Example 3) | 100 |
| HAF carbon black | 50 |
| Sulfur | 0.32 |
| Zinc oxide | 3 |
| Peroxide (99%) | 6.48 |

With this mix, progressive vulcanization tests were carried out at temperatures of 165° C. for successively increasing times. The vulcanizates had the following characteristics as reported in Tables A and B below:

TABLE A

[Temperature: 165° C.]

| Time in minutes | 2 | 4 | 6 | 8 | 10 | 20 |
|---|---|---|---|---|---|---|
| Tensile strength, kg./cm.$^2$ | 160 | 199 | 192 | 189 | 181 | 190 |
| Elongation at break, percent | 690 | 495 | 430 | 405 | 390 | 405 |
| Modulus at 200%, kg./cm.$^2$ | 29 | 49 | 52 | 63 | 66 | 68 |
| Modulus at 300%, kg./cm.$^2$ | 57 | 103 | 119 | 128 | 131 | 134 |
| Permanent set, percent | 15 | 11 | 7.5 | 6.5 | 7.5 | 6.5 |
| ISO hardness | 57 | 61 | 62.5 | 62 | 62 | 62.5 |

As can be seen from Table A above, complete vulcanization was reached after 10 minutes at 165° C.

The highest degree of vulcanization was reached after 30 minutes at 150° C. (See Table B below.)

TABLE B

[Temperature: 150° C.]

| Time in minutes | 4 | 8 | 12 | 16 | 20 | 24 | 28 | 30 | 40 |
|---|---|---|---|---|---|---|---|---|---|
| Tensile strength, kg./cm.$^2$ | 31 | 79 | 144 | 161 | 171 | 170 | 174 | 170 | 180 |
| Elongation at break, percent | 870 | 80 | 650 | 600 | 525 | 455 | 435 | 420 | 415 |
| Modulus at 200%, kg./cm.$^2$ | 10 | 14 | 24 | 24 | 41 | 45 | 52 | 55 | 55 |
| Modulus at 300%, kg./cm.$^2$ | 12 | 26 | 48 | 62 | 75 | 81 | 93 | 105 | 108 |
| Permanent set, percent | 50 | 26 | 16 | 13 | 10 | 9 | 9 | 7 | 7 |
| ISO hardness | 48 | 53 | 58 | 60 | 60.5 | 62 | 62 | 64 | 63 |

EXAMPLE 5

The resistance to ageing in an air oven of the vulcanizate obtained by using alpha-methoxy-alpha-tert.butylperoxy-ethyl-benzene was measured and compared with that obtained using cumyl peroxide.

Mixes having the following composition were prepared:

| | Parts by weight | |
|---|---|---|
| | A | B |
| Ethyl-propylene copolymer (as in Example 3) | 100 | 100 |
| HAF carbon black | 50 | 50 |
| Polymerized 1,2-dihydro-2,2,4-trimethylquinoline | 0.5 | 0.5 |
| Sulfur | 0.4 | 0.4 |
| Zinc oxide | 3 | 3 |
| Alpha-methoxy-alpha-tert. butylperoxy-ethyl-benzene (99%) | 7 | |
| Cumyl peroxide | | 3.4 |

The specimens thereof, vulcanized under the same conditions at 165° C. for 30 minutes, were aged in an oven at a temperature of 150° C. Periodic measurements of their tensile strengths gave the following values:

| | Tensile strength (kg./cm.$^2$) | |
|---|---|---|
| Time, days | A | B |
| 0 | 172 | 163 |
| 2 | 182 | 160 |
| 4 | 164 | 144 |
| 6 | 160 | 132 |
| 8 | 145 | 102 |
| 10 | 134 | 83 |
| 12 | 98 | 58 |

EXAMPLE 6

A mix of ethylene-propylene copolymer containing alpha-methoxy-alpha-cumyl peroxy-ethylbenzene and having the following composition was prepared:

| | Parts by weight |
|---|---|
| Ethylene-propylene copolymer (as in Example 3) | 100 |
| HAF carbon black | 50 |
| Zinc oxide | 3 |
| Sulfur | 0.32 |
| Peroxide (88%) | 11.0 |

Vulcanization: at 140° C. for 45 minutes.

The vulcanizate obtained showed the following mechanical characteristics:

| | |
|---|---|
| Tensile strength (kg./cm.$^2$) | 175 |
| Elongation at break (percent) | 435 |
| Modulus at 200% (kg./cm.$^2$) | 57 |
| Modulus at 300% (kg./cm.$^2$) | 108 |
| Permanent set (percent) | 8 |
| ISO hardness | 61 |

EXAMPLE 7

A mix of ethylene-propylene copolymer, containing alpha - isobutoxy-alpha-tert.butylperoxy-ethyl-benzene and having the following formulation, was prepared:

| | Parts by weight |
|---|---|
| Ethylene-propylene copolymer (as in Example 3) | 100 |
| HAF carbon black | 50 |
| Zinc oxide | 3 |
| Sulfur | 0.32 |
| Peroxide (95%) | 5.32 |

Vulcanization: at 150° C. for 9 minutes.

The vulcanizates showed the following mechanical characteristics:

| | |
|---|---|
| Tensile strength (kg./cm.$^2$) | 175 |
| Elongation at break (percent) | 440 |
| Modulus at 200% (kg./cm.$^2$) | 56 |
| Modulus at 300% (kg./cm.$^2$) | 110 |
| Permanent set (percent) | 7.5 |
| ISO hardness | 60 |

EXAMPLE 8

A mix of ethylene-propylene copolymer containing di-(1,1'-diphenyl-1,1'-diisobutoxy)ethyl-peroxide, having the formula

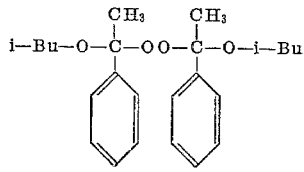

was prepared.

The mix had the following composition:

| | Parts by weight |
|---|---|
| Ethylene-propylene copolymer (as in Example 3) | 100 |
| HAF carbon black | 50 |
| Zinc oxide | 3 |
| Sulfur | 0.32 |
| Peroxide (91%) | 7.7 |

Vulcanization: at 150° C. for 25 minutes.

The vulcanizate obtained showed the following characteristics:

| | |
|---|---|
| Tensile strength (kg./cm.$^2$) | 178 |
| Elongation at break (percent) | 416 |
| Modulus at 200% (kg./cm.$^2$) | 61 |
| Modulus at 300% (kg./cm.$^2$) | 118 |
| Permanent set (percent) | 7.5 |
| ISO hardness | 61 |

EXAMPLE 9

A mix of ethylene-propylene copolymer containing 2-tert. butyl-peroxy - 2 - isopropoxy-propane and having the following formulation was prepared:

| | Parts by weight |
|---|---|
| Ethylene-propylene copolymer (as in Example 3) | 100 |
| HAF carbon black | 50 |
| Zinc oxide | 3 |
| Sulfur | 0.32 |
| Peroxide (95%) | 5 |

Vulcanization: at 165° C. for 15 minutes.

The vulcanizate showed the following mechanical characteristics:

| | |
|---|---|
| Tensile strength (kg./cm.$^2$) | 171 |
| Elongation at break (percent) | 430 |
| Modulus at 200% (kg./cm.$^2$) | 56 |
| Modulus at 300% (kg./cm.$^2$) | 103 |
| Permanent set (percent) | 8 |
| ISO hardness | 52 |

EXAMPLE 10

A mix of ethylene-propylene copolymer containing 1,4-di[2,2'-di(ethoxy isopropylperoxy)isopropyl]benzene,

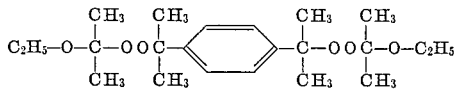

and having the following formulation, was prepared:

| | Parts by weight |
|---|---|
| Ethylene-propylene copolymer (as in Example 3) | 100 |
| HAF carbon lback | 50 |
| Zinc oxide | 3 |
| Sulfur | 0.32 |
| Peroxide (85%) | 5 |

Vulcanization: at 165° C. for 10 minutes.

The vulcanizate obtained showed the following mechanical characteristics:

| | |
|---|---|
| Tensile strength (kg./cm.$^2$) | 168 |
| Elongation at break (percent) | 450 |
| Modulus at 200% (kg./cm.$^2$) | 52 |
| Modulus at 300% (kg./cm.$^2$) | 103 |
| Permanent set (percent) | 8.5 |
| ISO hardness | 54 |

EXAMPLE 11

A mix of ethylene-propylene copolymer, containing alpha, alpha' -dimethoxy-alpha, alpha' -di-tert.butyl-peroxy-p-diethyl-benzene,

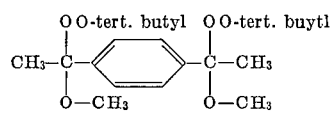

and having the following composition, was prepared:

| | Parts by weight |
|---|---|
| Ethylene-propylene copolymer (as in Example 3) | 100 |
| HAF carbon black | 50 |
| Zinc oxide | 3 |
| Sulfur | 0.32 |
| Peroxide (85%) | 6.4 |

Vulcanization: at 150° C. for 25 minutes.

The vulcanizate showed the following mechanical characteristics:

| | |
|---|---|
| Tensile strength (kg./cm.$^2$) | 168 |
| Elongation at break (percent) | 410 |
| Modulus at 200% (kg./cm.$^2$) | 56 |
| Modulus at 300% (kg./cm.$^2$) | 107 |
| Permanent set (percent) | 8 |
| ISO hardness | 61 |

EXAMPLE 12

This example illustrates the superior results obtained particularly as regards higher modulus and lower permanent set, which are obtained when employing a peroxide of the present invention as compared with a similar peroxide wherein $R_1$ is hydrogen. The compositions vulcanized, the vulcanizing conditions and the properties of the resulting vulcanizates are set forth in Table 1 below.

TABLE 1

| | 1 | 2 | 3 | 4 | 5 |
|---|---|---|---|---|---|
| Ethylene-propylene (60% by mol) copolymer (ML-35) | 100 | 100 | 100 | 100 | 100 |
| HAF carbon black | 50 | 50 | 50 | 50 | 05 |
| Zinc oxide | 3 | 3 | 3 | 3 | 3 |
| Sulfur | 0.32 | 0.32 | 0.32 | 0.32 | 0.32 |
| 1-tert. butyl-peroxy-1-sec.-butoxy-ethane, parts by weight (mols) | 4.4 (0.0233) | | | | |
| α-Tert.butyl-peroxy-α-sec.butoxy-ethyl-benzene, parts by weight (mols) | | 6.2 (0.0233) | | | 4 (0.015) |
| 1-tert.butyl-peroxy-1-tert.butoxy-ethane, parts by weight (mols) | | | 2.1 (0.0113) | | |
| α-Tert.butyl-peroxy-α-tert.butoxy-ethyl-benzene, parts by weight (mols) | | | | 3 (0.0113) | |
| Vulcanization conditions, minutes/° C | 30'/165° | 30'/165° | 30'/165° | 30'/165° | 30'/165° |
| Tensile strength, kg./cm.$^2$ | 150 | 178 | 93 | 211 | 164 |
| Elongation at break, percent | 585 | 440 | 825 | 400 | 490 |
| Modulus at 200% elongation, kg./cm.$^2$ | 25 | 52 | 25 | 75 | 46 |
| Modulus at 300% elongation, kg./cm.$^2$ | 52 | 105 | 34 | 145 | 80 |
| Permanent set at 200% elongation, percent | 15 | 10 | 28.0 | 10 | 11.5 |
| ISO hardness, percent | 57 | 56.5 | 57 | 71.5 | 56 |

It will be seen that far superior results are obtained in runs 2, 4 and 5, wherein peroxides of the present invention are employed. Particularly noteworthy is the fact that superior results are obtained in run 5 even though only slightly more than half the molar amount of peroxide is employed as compared with the amount of peroxide employed in run 1.

EXAMPLE 13

In order to compare vulcanization times achieved with the peroxides of the present invention as compared with those wherein $R_1$ is hydrogen, several vulcanizable mixtures were prepared, using an ethylene-propylene copolymer (60% by mols of propylene, ML (1+4) at 100° C.=35). The vulcanization times were tested by the method described by H. D. Stemmer, Keatschuk and Gummi, 14 (5) WT 146 (1961). The mixtures had the following composition: 100 parts by weight of copolymer, 50 parts of HAF carbon black, 0.32 part by weight of sulfur and the same molar amount of one of the peroxides, as set forth in Table 2.

The vulcanization of the mixes was then carried out at 150° C. and, respectively, at 165° C. and the time thereof in minutes was determined in a curometer, as reported in Table 2.

TABLE 2

| Mix containing the following peroxide | Vulcanization time, minutes | |
|---|---|---|
| | at 150° C. | at 165° C. |
| 6 — 1-tert.butylperoxy-1-ethoxy-ethane, 6.48 parts by weight [1]. | 39 | 17 |
| 7 — Alpha-tert.butylperoxy-alpha-ethoxy-ethylbenzene, 5.6 parts by weight [1]. | 24 | 9 |
| 8 — 1-tert-butylperoxy-1-sec.butoxy-ethane, 7.5 parts by weight [1]. | 49 | 15 |
| 9 — Alpha-tert.butylperoxy-alpha-sec.butoxy-ethylbenzene, 6.2 parts by weight [1]. | 19 | 8 |
| 10 — 1-tert.butylperoxy-1-tert.butoxy-ethane, 7.0 parts by weight [1]. | 39 | 12 |
| 11 — Alpha-tert.butylperoxy-alpha-butoxy-ethylbenzene, 3.0 parts by weight [1]. | 31 | 6 |

[1] The different amounts by weight used in the above mixes were such as to impart to the vulcanizates obtained therefrom the same degree of crosslinking.

It is clear that mixes 7, 9 and 11, containing the peroxides of the present invention, are vulcanized at considerably shorter vulcanizing times than mixes 6, 7 and 10, containing peroxides wherein $R_1$ is hydrogen.

EXAMPLE 14

The resistance to ageing of various vulcanizates was measured in order to compare the influence of the type of peroxide used.

The following mixes were prepared as set forth in Table 3, in which the amounts used are listed in parts by weight (and, for the peroxides, the amount in mols is also indicated in brackets).

The mixes were vulcanized at 165° C. for 30 minutes and the specimens prepared therefrom were placed in an oven at a temperature of 150° C. for the ageing tests. The variation of the tensile strength of the vulcanizates was measured periodically. The results are set forth in Table 4.

TABLE 4

| Time, days | Percent residual tensile strength | | | |
|---|---|---|---|---|
| | 12 | 13 | 14 | 15 |
| 0 | 100 | 100 | 100 | 100 |
| 2 | 105 | 101 | 96 | 85 |
| 4 | 102 | 101 | 88 | 73 |
| 6 | 94 | 99 | 77 | 50 |
| 8 | 84 | 92.5 | 57 | 23 |
| 10 | 72.5 | 81 | 15 | |
| 12 | 57.5 | 66 | | |

From the percent residual tensile strength set forth in Table 4, it is clear that vulcanizates 12 and 13, obtained using as curing agent a peroxyether of the present invention, exhibit a remarkably higher resistance to ageing than vulcanizates 14 and 15, which were cured with a peroxyether wherein $R_1$ is hydrogen.

EXAMPLE 15

The resistance to ageing of various vulcanizates was measured in order to compare the influence of the type of peroxide used.

The following mixes were prepared:

| | A | B | C | D |
|---|---|---|---|---|
| Ethylene-propylene copolymer (as in Example 1) | 100 | 100 | 100 | 100 |
| HAF carbon black | 50 | 50 | 50 | 50 |
| Polymerized 1,2-dihydro-2,2,4-trimethylquinoline | 0.5 | 0.5 | 0.5 | 0.5 |
| Sulfur | 0.4 | 0.4 | 0.4 | 0.4 |
| 2-tert.butylperoxy-2-methoxypropane | 6 | | | |
| Dicumylperoxide | | 3.4 | | |
| 2,2-di(4,4'-bis(tert.butyl-peroxy)-cyclohexyl)-propane | | | 3.7 | |
| 2,2,5,5-tetra(tert.butylperoxy)hexane | | | | 8 |

From these mixes some specimens vulcanized at 165° C. for 30 minutes were prepared. They were placed in an oven at a temperature of 150° C. for ageing tests, and the variation of their tensile strength was measured periodically.

The four vulcanizates give the following values:

| Time, days | Percent residual tensile strength | | | |
|---|---|---|---|---|
| | A | B | C | D |
| 0 | 100 | 100 | 100 | 100 |
| 2 | 100 | 98 | 87 | 87 |
| 4 | 94 | 89 | 56 | 72 |
| 6 | 90 | 81 | 27 | 19 |
| 8 | 79 | 62 | 13 | 15 |
| 10 | 72 | 54 | | |
| 12 | 50 | 35 | | |

TABLE 3

| Component | Parts by weight (mols) | | | |
|---|---|---|---|---|
| | 12 | 13 | 14 | 15 |
| Ethylene-propylene copolymer (60% by mols of propylene) ML (1+4) at 100° C.=35 | 100 | 100 | 100 | 100 |
| HAF carbon black | 50 | 50 | 50 | 50 |
| ZnO | 3 | 3 | 3 | 3 |
| Polymerized 1,2-dihydro-2,2,4-trimethylquinoline | 0.5 | 0.5 | 0.5 | 0.5 |
| Sulfur | 0.4 | 0.4 | 0.4 | 0.4 |
| Alpha-methoxy-alpha-tert.butylperoxy-ethylbenzene | 7 ([1] 0.0312) | | | |
| Alpha-isobutoxy-alpha-tert.butylperoxy-ethylbenzene | | 6.75 ([1] 0.0254) | | |
| 1-tert. butylperoxp-1-tert. butoxy-ethane | | | 7.0 ([1] 0.0368) | |
| 1-sec.butoxy-1-tert.butylperoxy-ethane | | | | 7.5 ([1] 0.0395) |

[1] The different amounts by mols used in the above mixes were such as to impart to the vulcanizates obtained therefrom the same degree of cross-linking.

EXAMPLE 16

In a common roll mixer a mix having the following composition was prepared:

| | Parts by weight |
|---|---|
| Ethylene/propylene (60 mole percent) [1]/6-methyl-4,7,8,9-tetrahydroindene (1.02% mol) terpolymer; ML (1+4) 100° C.=40 | 100 |
| HAF carbon black | 50 |
| Zinc oxide | 3 |
| Sulfur | 0.35 |
| 2-methoxy-2-tert.butyl-peroxy-propane | 4.6 |

[1] This amount refers to propylene.

From the mix a lamina vulcanized in a press at 165° C. for 12 minutes was prepared which had the following characteristics:

| | |
|---|---|
| Tensile strength (kg./cm.$^2$) | 195 |
| Elongation at break (percent) | 430 |
| Modulus at 200% (kg./cm.$^2$) | 63 |
| Modulus at 300% (kg./cm.$^2$) | 143 |
| Permanent set at 100% (percent) | 9.5 |
| ISO hardness | 59 |

EXAMPLE 17

A mix having the following composition was prepared:

| | Parts by weight |
|---|---|
| Ethylene-propylene copolymer (as in Example 1) | 100 |
| HAF carbon black | 50 |
| Zinc oxide | 3 |
| Sulfur | 0.32 |
| α-Methoxy-α-cumylperoxy-ethylbenzene | 7.0 |

From this mix a lamina vulcanized in a press at 165° C. for 11 minutes was prepared, on which the following characteristics were determined:

| | |
|---|---|
| Tensile strength (kg./cm.$^2$) | 214 |
| Elongation at break (percent) | 395 |
| Modulus at 200% (kg./cm.$^2$) | 71 |
| Modulus at 300% (kg./cm.$^2$) | 148 |
| Permanent set (at 100%) (percent) | 9 |
| ISO hardness | 65 |

Variations can, of course, be made without departing from the spirit and scope of the invention.

Having thus described our invention, what we desire to secure by Letters Patent and hereby claim is.

1. Vulcanizable compositions containing (1) an elastomeric polymer selected from the group consisting of a saturated amorphous copolymer of ethylene with a higher alpha-olefin and a terpolymer of ethylene with a higher alpha-olefin and a cyclic or acyclic polyene having non-conjugated double bonds, said terpolymer having low residual unsaturation, (2) a carbon black reinforcing filler, (3) a free radical acceptor and (4) a free radical generating agent selected from the group consisting of peroxyethers of the formulae:

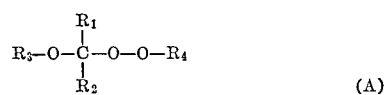

(A)

and

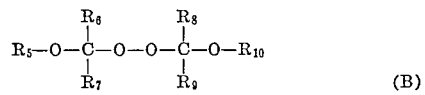

(B)

wherein $R_1$ is an unsubstituted alkyl or cycloalkyl radical containing up to 10 carbon atoms or an unsubstituted or alkyl substituted aryl radical containing up to 10 carbon atoms; $R_2$ is an unsubstituted alkyl or cycloalkyl radical containing up to 10 carbon atoms or an unsubstituted or alkyl substituted aryl radical containing up to 10 carbon atoms; and $R_1$ and $R_2$, taken together with the central carbon atom, can form a cycloaliphatic ring; $R_3$ is an unsubstituted alky or an unsubstituted or alkyl substituted cycloalkyl, aryl, or arylalkyl radical containing up to 10 carbon atoms; $R_4$ is an unsubstituted alkyl or an unsubstituted or alkyl substituted tertiary arylalkyl radical containing up to 10 carbon atoms; or one of $R_2$ and $R_4$, but not both simultaneously, may have the following formula A or B, respectively; either (A) $R_2$ may have the formula:

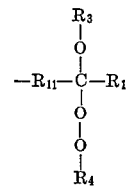

wherein $R_{11}$ contains up to 10 carbon atoms and is an unsubstituted or alkyl substituted alkylene, cycoalkylene, alkenylene, alkinylene or arylene radical, and $R_1$, $R_3$ and $R_4$ are as defined above, or (B) $R_4$ may have the formula:

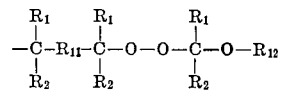

wherein $R_1$, and $R_2$ and $R_{11}$ are as defined above; $R_{12}$ is an unsubstituted alkyl or an unsubstituted or alkyl substituted tertiary arylalkyl radical containing up to 10 carbon atoms; $R_6$, $R_7$, $R_8$ and $R_9$ are each an unsubstituted alkyl or cycloalkyl radical containing up to 10 carbon atoms, or an unsubstituted or alkyl substituted aryl radical containing up to 10 carbon atoms; $R_5$ and $R_{10}$ are each an unsubstituted alkyl or an unsubstituted or alkyl substituted cycloalkyl, aryl, or arylalkyl radical containing up to 10 carbon atoms; and $R_6$ and $R_7$ and/or $R_8$, $R_9$ may form a cycloaliphatic ring with the central carbon atom to which they are linked.

2. The composition of claim 1 wherein at least one of the radicals $R_1$, $R_2$, $R_3$, $R_4$, $R_5$, $R_6$, $R_7$, $R_8$, $R_9$, and $R_{10}$ contains an alkyl substituent.

3. The vulcanizable composition of claim 1 wherein the peroxyether is present in an amount of from about 0.1 to 20 parts by weight per 100 parts of elastomeric polymer.

4. The composition of claim 3 wherein the amount of peroxyether is from about 1 to 10 parts by weight.

5. The vulcanizable composition of claim 1 wherein the free-radical acceptor is sulfur, a quinone compound, a vinyl or divinyl monomer, an alkyl or polyalkyl monomer, a polymer containing vinyl unsaturation, a dimaleimide, furfural, or a derivative of any of the foregoing, and is present in an amount of from about 0.1 to 10 weight percent based on the weight of said polymer.

6. The composition of claim 5 wherein the amount of said free-radical acceptor is from about 0.3 to 3 weight percent.

7. The vulcanizable composition of claim 1 which further contains a metal oxide in an amount of from about 0.1 to 10 weight percent, based on the weight of said polymer.

8. The vulcanizable composition of claim 1 wherein said elastomeric polymer is a copolymer of ethylene with an alpha-olefin, said copolymer being a saturated amorphous copolymer of ethylene with propylene or butene-1 and having an ethylene content of from about 20 to 80 mole percent and a Mooney viscosity, ML (1+4) at 100° C., of from about 20 to 80, corresponding to a molecular weight from about 50,000 to 800,000.

9. The vulcanizable composition of claim 1 wherein said elastomeric polymer is a terpolymer said terpolymer being selected from the group consisting of terpolymers of ethylene with propylene and a third monomer from the group consisting of cyclooctadiene-1,5, cyclooctadiene-1,4, cyclododecadiene-1,6, cyclododecadiene-1,7, cyclododecatriene-1,5,9, cycloheptadiene-1,4, cyclohexadiene-1,4, norbornadiene, methylnorbornene, 2-methylpentadiene-1,4, hexadiene-1,5, 6-methyl-4,7,8,9-tetrahydroindene, 5,6-dimethyl-4,7,8,9-tetrahydroindene and dicyclopentadiene, said terpolymer containing from about 0.05 to 1 double bond per 100 carbon atoms, having a molecular weight of from about 50,000 to 800,000 and an ethylene content of from about 20 to 80 mole percent.

10. The composition of claim 9 wherein the molecular weight of said terpolymer is from about 80,000 to 500,000.

11. The composition of claim 1 in vulcanized form.

References Cited

UNITED STATES PATENTS

| | | | |
|---|---|---|---|
| 2,822,353 | 2/1958 | Bankert et al. | 260—88.1 |
| 3,265,670 | 8/1966 | Scott | 260—88.1 |

MORRIS LIEBMAN, Primary Examiner

S. L. FOX, Assistant Examiner

U.S. Cl. X.R.

260—11.5, 88.2, 610

UNITED STATES PATENT OFFICE
CERTIFICATE OF CORRECTION

Patent No. 3,575,920          Dated April 20, 1971

Inventor(s) GIULIANO BALLINI and CARLO BUJTAR

It is certified that error appears in the above-identified patent and that said Letters Patent are hereby corrected as shown below:

Column 3, first structural formula, that portion of the formula reading

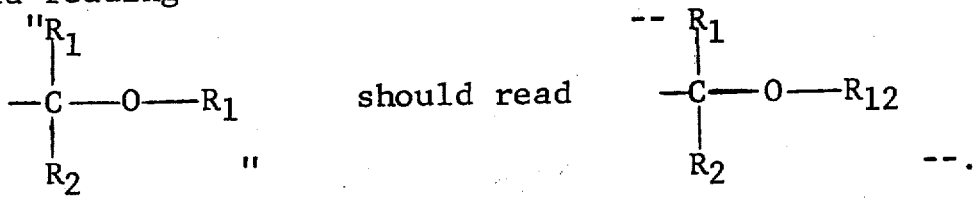

Column 3, line 29: "conjugtaed" should read -- conjugated --; line 45: "peroxxy" should read -- peroxy --; line 58: "(ter butylperoxyl)-" should read -- (tert.butylperoxy)- --. Colun 4, line 26: After "alumina" insert a comma (,). Column 7, line 56: "Ethyl-propylene" should read -- Ethylene-propylene Column 10, line 49: After "obtained" insert a comma (,). Columns 9 and 10, Table I, second line under heading "5": "( should read -- 50 --. Column 11, Table 2, under heading "Mi: Containing, etc.", first line: "etroxy" should read -- etho: under same heading: "7,0" should read -- 7.0 --. Columns 1 and 12, Table 3, under heading "Component", line 9, "butylpe: should read -- butylperoxy --. Column 13, Claim 1, line 52: "polylene" should read -- polyene --. Column 14, Claim 1, 1: 2: "alky" should read -- alkyl --; line 28: "$R_1$, and $R_2$ an $R_{11}$" should read -- $R_1$, $R_2$ and $R_{11}$ --; line 38: "$R_8$, $R_9$" sh read -- $R_8$ and $R_9$ --.

Signed and sealed this 13th day of June 1972.

(SEAL)
Attest:

EDWARD M. FLETCHER, JR.
Attesting Officer

ROBERT GOTTSCHALK
Commissioner of Patents